Patented May 4, 1926.

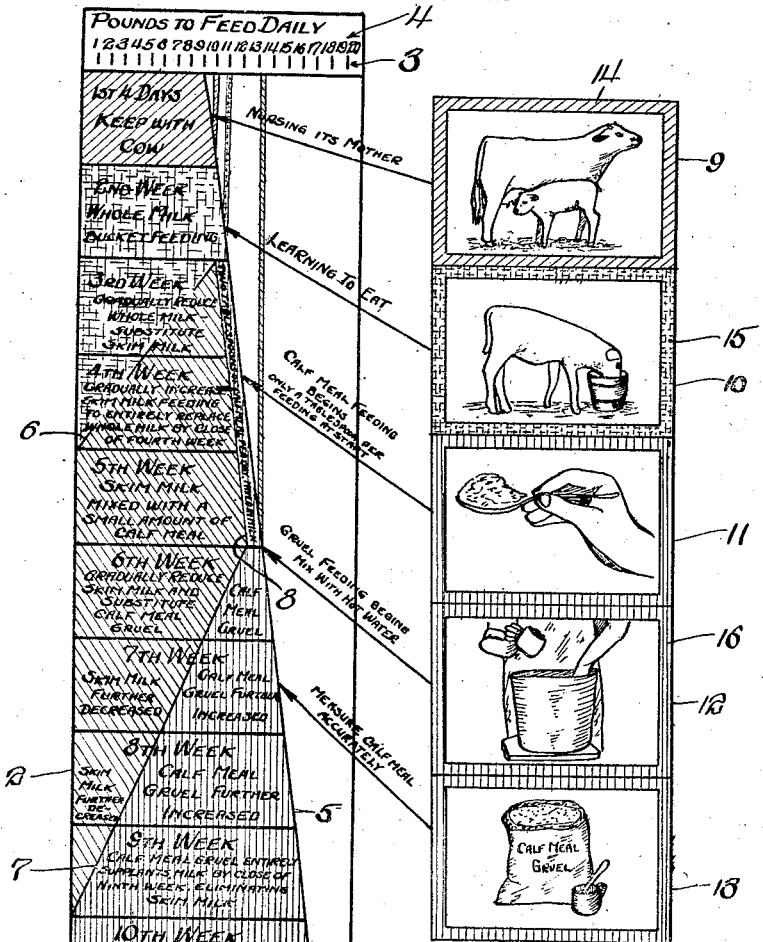

1,583,527

UNITED STATES PATENT OFFICE.

RALPH E. CALDWELL, OF WAUKEGAN, ILLINOIS, ASSIGNOR TO BLATCHFORD CALF MEAL COMPANY, OF WAUKEGAN, ILLINOIS.

CHART FOR FEEDING.

Application filed April 16, 1923. Serial No. 632,283.

*To all whom it may concern:*

Be it known that I, RALPH E. CALDWELL, a citizen of the United States, residing at Waukegan, in the county of Lake and State of Illinois, have invented certain new and useful Improvements in Charts for Feeding, of which the following is a specification.

While my improved chart may be arranged in various ways for various kinds of feeds, it is especially applicable to the liquid feeding of calf meal or milk substitute in weaning and developing calves or other young animals. While printed directions or instructions are useful in connection with the feeding of different feeds for animals, it is often more or less difficult for the average person to study such directions and carry them out in a proper and intelligent manner.

The objects of the present invention are to provide an instruction chart for feeding calves or other young animals whereby it may be readily determined from a simple inspection of a chart as to the proper character and amount of feed for the calf or other animal and to the changes or combinations of feed which should be made as the calf or animal develops; another object is to provide a chart of this character which is outlined to indicate the amount of feed and colored to indicate the character or kind of feed; to provide a chart having accompanying instruction printed thereon and also preferably having accompanying illustrations to assist in the ready understanding of the chart; and in general to provide such an improved instruction chart or card as will be described more fully hereinafter.

The accompanying drawing illustrates a preferred form of my improved chart as arranged for the feeding of calves.

In this particular arrangement of the chart I provide a rectangular border or outline 2 which may for convenience be called the feed card. The upper end of this card is provided with a scale or divisions 3 with accompanying numbers as indicated at 4 for indicating the number of pounds to be fed daily and the legend "Pounds to feed daily" is printed at the top of the card. While the card or column may be made to cover any period of time, it is shown to represent a period of twenty-six weeks and is divided longitudinally with equal divisions one, two, three, etc., each representing one week.

This table is arranged for the feeding of a ninety pound calf and on the basis of feeding one-tenth of the calf's weight each day up to about the beginning of the fourteenth week. This is indicated by a line 5 which extends diagonally from the ninth division of the scale 3 to the extreme right hand edge of the card 2 at about the line indicating the beginning of the fourteenth week.

While the chart or card is divided to indicate the different foods it is also preferably colored as is indicated in the drawing. The column 2 has four colored divisions which show the kind of feed to supply calves at various ages during the period indicated as well as the time required to make changes from one feed to another. While the column is thus marked to indicate the different feeds, it is preferably accompanied by descriptive statement of each of the four feeds indicated to be used, but as such statements are more or less general they are not shown in the accompanying drawing. The colored portions of the chart indicate four feeds which it is considered that every calf should have. The first is the liquid colostrum supplied by the cow for the immediate use of the calf, which gradually changes to normal or whole milk. The milk supplied directly by the cow is indicated in brown on the chart in the first division. The whole milk which may be fed by bucket is shown in yellow and covers the second week or second division and extends down through to the end of the fourth week, a diagonal line 5 being arranged to show the gradual reduction of the whole milk. This line also indicates the division showing the change from whole milk to skim milk which is indicated in green and continues down through to the end of the ninth week. A diagonal line 7 indicates the gradual reduction of the amount of skim milk and the gradual increase of the amount of calf meal or calf meal gruel to be fed. A line 8 which is parallel to the line 5 extends from the end of the second week to the beginning of the sixth week and the space included between these lines is also colored red, this area indicating the beginning of the feeding of a small amount of calf feed during this period and this area is also colored red.

From this description it will be seen that the proper amount of feed and the kind of feed to be used may be readily determined by means of this chart and it is particularly noted that the calf meal or gruel should be gradually increased as shown in the chart from the beginning of the sixth week until it entirely replaces the milk portion at the end of the ninth week. The gruel should then be fed exclusively until the calf is about twenty-six weeks or six months of age.

While this card or column shows the essential features necessary for feeding, I prefer to have the same accompanied by a series of pictures such as shown at 9 to 13, inclusive, which further illustrate the kinds and method of feeding. The first picture as indicated at 9 is preferably provided with a brown border 14 corresponding with the brown area of the first week, this picture illustrating the proper feeding during such period. The picture shown at 10 has a yellow border 15 corresponding with the yellow area of the chart or column 2 and such picture illustrates the proper method of feeding during this period. The pictures 11, 12 and 13 all relate to the feeding of the calf meal and the border 16 of these pictures is colored red to correspond to the similarly colored area of the column.

It will be noted that this chart or illustrated method of feeding may be changed to show different foods and may be changed to illustrate the proper feeding for other animals and therefore I do not wish to be limited to the exact arrangement illustrated and described, except as specified in the following claims, in which I claim:

1. A chart for indicating feed to be given, having lateral divisions appropriately designated to indicate the amount of feed to be given during specified times, and longitudinal divisions appropriately designated to indicate time and having areas designated to indicate the kind and amount of feed to be given during certain specified times.

2. A card of the character set forth, having a transverse scale designated to indicate the amount to be fed daily and having longitudinal divisions designated to indicate time, said card also having diagonal lines dividing the same into areas, said areas being designated to indicate the kinds of food and the amount of food to be given to an animal during certain specified times.

3. A card for indicating food to be given, having a scale arranged crosswise thereof designated to indicate the amount to be fed to an animal daily and having longitudinal divisions designated to represent weeks, said card also having diagonal lines designated to indicate the varying amount of different feeds to be fed during certain periods, the areas included between the various lines being marked to show the character of the feed.

R. E. CALDWELL.